(12) United States Patent
Chou et al.

(10) Patent No.: US 9,990,903 B2
(45) Date of Patent: Jun. 5, 2018

(54) ELECTRONIC DEVICE HAVING DISPLAY DEVICE FOR SYNC BRIGHTNESS CONTROL AND OPERATING METHOD THEREOF

(71) Applicant: WISTRON CORP., New Taipei (TW)

(72) Inventors: Sheng-Jung Chou, New Taipei (TW); Sheng-Kai Tseng, New Taipei (TW)

(73) Assignee: WISTRON CORP., New Taipei (TW)

(*) Notice: Subject to any disclaimer, the term of this patent is extended or adjusted under 35 U.S.C. 154(b) by 0 days. days.

(21) Appl. No.: 14/147,573

(22) Filed: Jan. 5, 2014

(65) Prior Publication Data
US 2015/0009122 A1   Jan. 8, 2015

(30) Foreign Application Priority Data

Jul. 5, 2013   (TW) .............................. 102124242 A

(51) Int. Cl.
| | | |
|---|---|---|
| *G09G 5/00* | (2006.01) | |
| *G09G 5/10* | (2006.01) | |
| *G06F 3/14* | (2006.01) | |
| *G06F 3/0489* | (2013.01) | |
| *G06F 1/16* | (2006.01) | |

(52) U.S. Cl.
CPC ............. *G09G 5/10* (2013.01); *G06F 1/1671* (2013.01); *G06F 3/04897* (2013.01); *G06F 3/14* (2013.01); *G09G 2320/0606* (2013.01); *G09G 2320/0626* (2013.01)

(58) Field of Classification Search
CPC ... G09G 2320/0626; G09G 2320/0633; G09G 2320/064; G09G 2320/0646; G09G 2320/0653
See application file for complete search history.

(56) References Cited

U.S. PATENT DOCUMENTS

| | | | | |
|---|---|---|---|---|
| 5,613,135 A | * | 3/1997 | Sakai et al. ..................... | 710/62 |
| 5,680,482 A | * | 10/1997 | Liu et al. ..................... | 382/233 |
| 5,870,617 A | * | 2/1999 | Walsh et al. .................. | 713/324 |

(Continued)

OTHER PUBLICATIONS

"Windows 7 Brightness Control for Integrated Displays," Jan. 9, 2009, Microsoft.*

(Continued)

*Primary Examiner* — William Lu
(74) *Attorney, Agent, or Firm* — CKC & Partners Co., Ltd.

(57) ABSTRACT

An electronic device having a display device for sync brightness control includes a brightness key, an embedded controller, a storage unit, a processing unit, a peripheral controlling circuit and BIOS. The storage unit stores an operating system and a brightness application. The processing unit executes the brightness control application in the operating system. The peripheral controlling circuit receives a request from the brightness key. The BIOS acquires the request from the peripheral controlling circuit and send an event to notify a brightness user interface of the operating system, so that the brightness user interface notifies a driver in the operating system and sends a brightness adjusting command to the brightness control application according to the event. The brightness control application notifies the embedded controller to adjust the brightness of the display device according to the brightness adjusting command.

4 Claims, 2 Drawing Sheets

(56) References Cited

U.S. PATENT DOCUMENTS

| | | | | |
|---|---|---|---|---|
| 6,463,483 | B1* | 10/2002 | Imperiali | G06F 13/28 710/22 |
| 7,194,623 | B1* | 3/2007 | Proudler et al. | 713/164 |
| 2001/0001152 | A1* | 5/2001 | Arai et al. | 710/129 |
| 2004/0104709 | A1* | 6/2004 | Yamaji et al. | 320/150 |
| 2004/0183765 | A1* | 9/2004 | Morisawa | G09G 3/3406 345/89 |
| 2004/0207613 | A1* | 10/2004 | Morisawa | G09G 3/3406 345/207 |
| 2005/0022039 | A1* | 1/2005 | Inui et al. | 713/300 |
| 2005/0050312 | A1* | 3/2005 | Oshiba et al. | 713/1 |
| 2005/0251697 | A1* | 11/2005 | Narukawa | G06F 3/0238 713/310 |
| 2005/0288064 | A1* | 12/2005 | Lin et al. | 455/564 |
| 2006/0232530 | A1* | 10/2006 | Nagasawa | 345/87 |
| 2007/0011471 | A1* | 1/2007 | Yu et al. | 713/300 |
| 2007/0097068 | A1* | 5/2007 | Tanaka et al. | 345/102 |
| 2007/0169116 | A1* | 7/2007 | Gujarathi | G06F 9/4411 717/174 |
| 2007/0240074 | A1* | 10/2007 | Banks | 715/771 |
| 2008/0315785 | A1* | 12/2008 | Price et al. | 315/277 |
| 2009/0064186 | A1* | 3/2009 | Lin | 719/315 |
| 2009/0091537 | A1* | 4/2009 | Huang et al. | 345/169 |
| 2009/0278679 | A1* | 11/2009 | Dailey et al. | 340/500 |
| 2009/0322795 | A1* | 12/2009 | Vasquez et al. | 345/690 |
| 2010/0036980 | A1* | 2/2010 | Stedman et al. | 710/36 |
| 2012/0002110 | A1* | 1/2012 | Barnhoefer | G09G 3/3406 348/468 |
| 2012/0268474 | A1* | 10/2012 | Hachiya | 345/581 |
| 2013/0007429 | A1* | 1/2013 | Andou | 713/1 |
| 2013/0076630 | A1* | 3/2013 | Tseng et al. | 345/168 |

OTHER PUBLICATIONS

The office action of the corresponding Chinese application dated Mar. 2, 2016 and its partial English translation of the markup paragraph.

\* cited by examiner

ELECTRONIC DEVICE HAVING DISPLAY DEVICE FOR SYNC BRIGHTNESS CONTROL AND OPERATING METHOD THEREOF

RELATED APPLICATIONS

This application claims priority to Taiwanese Patent Application No. TW102124242, filed Jul. 5, 2013, the entirety of which is herein incorporated by reference.

BACKGROUND

Technical Field

The present disclosure relates to an electronic device, and more particularly, an electronic having a display device for synchronized brightness control and an operating method thereof.

Description of Related Art

When using a computer, users often have to adjust the brightness of the display device, so as to satisfy the visual needs. Currently, the means for adjusting the brightness of the display device can be classified into two schemes: first, using an external brightness key for adjustment; second, using brightness user interface of the operating system for adjustment. However, these two schemes are not synchronized, thereby causing troubles to users.

On the other hand, certain software companies developing the operating systems will request that the brightness shall be adjusted via the driver only so that the computer passes the certification of the software companies; accordingly, the computer manufacturer has to re-design the product.

In view of the foregoing, there exist problems and disadvantages in the related art that await further improvement. However, those skilled in the art sought vainly for a solution. In order to solve or circumvent above problems and disadvantages, there is an urgent need in the related field to achieve synchronized brightness control.

SUMMARY

The following presents a simplified summary of the disclosure in order to provide a basic understanding to the reader. This summary is not an extensive overview of the disclosure and it does not identify key/critical components of the present disclosure or delineate the scope of the present disclosure. Its sole purpose is to present some concepts disclosed herein in a simplified form as a prelude to the more detailed description that is presented later.

In one aspect, the present disclosure provides an electronic device having a display device for synchronized brightness control and an operating method thereof, to overcome the problems which has faced the prior art.

According to one embodiment of the present disclosure, an electronic device comprises an external brightness key, an embedded controller, a storage unit, a processing unit, a peripheral controlling circuit and a basic input/output system (BIOS). The embedded controller is electrically connected to the display device, the processing unit is electrically connected to the storage unit, the peripheral controlling circuit is electrically connected to the embedded controller, the external brightness key is electrically connected to the embedded controller and the peripheral controlling circuit, and the BIOS is electrically connected to the peripheral controlling circuit and the processing unit. The storage unit is configured to store the operating system and the brightness control application; the processing unit is configured to execute the brightness control application in the operating system; the peripheral controlling circuit is configured to receive a request from the external brightness key; the BIOS is configured to acquire the request from the peripheral controlling circuit, and send an event to notify the brightness user interface of the operating system, so that the brightness user interface notifies a driver in the operating system and sends a brightness adjusting command to the brightness control application according to the event, and the brightness control application notifies the embedded controller to adjust the brightness of the display device according to brightness adjusting command.

In one embodiment, after the external brightness key is triggered, the external brightness key sends the request to the embedded controller, and the embedded controller notifies the BIOS of the request via the peripheral controlling circuit.

In one embodiment, the peripheral controlling circuit is a south bridge circuit that has a serial communication interface configured to receive the request.

In one embodiment, the embedded controller has a low pin count (LPC) bus configured to receive the notification of the brightness control application.

In one embodiment, the embedded controller sends a pulse width modulated signal to display device to adjust the brightness of the display device.

In one embodiment, the operating system is a Microsoft operating system.

In one embodiment, the display device is a flat display panel.

On the other hand, the operating method according to the present disclosure includes: (a) executing the brightness control application in the operating system; (b) receiving a request from an external brightness key via a peripheral controlling circuit; and (c) using a basic input/output system to acquire the request from the peripheral controlling circuit, and send an event to notify a brightness user interface of the operating system, so that the brightness user interface notifies a driver in the operating system and sends a brightness adjusting command to the brightness control application according to the event, and the brightness control application notifies an embedded controller according to the brightness adjusting command to adjust the brightness of the display device.

In one embodiment, the step (b) comprises: sending the request to the embedded controller after the external brightness key is triggered; and notifying the basic input/output system of the request via the peripheral controlling circuit, when the embedded controller.

In one embodiment, the peripheral controlling circuit is a south bridge circuit, and the step (b) comprises: receiving the request via a serial communication interface of the south bridge circuit.

In one embodiment, the embedded controller has a low pin count bus, and the step (c) comprises: receiving the notification of the brightness control application via the low pin count bus.

In one embodiment, the step (c) comprises: sending a pulse width modulated signal to the display device via the embedded controller to adjust the brightness of the display device.

In one embodiment, operating system is a Microsoft operating system.

In view of the foregoing, the technical solutions of the present disclosure result in significant advantageous and beneficial effects, compared with existing techniques. The implementation of the above-mentioned technical solutions achieves substantial technical improvements and provides utility that is widely applicable in the industry. Specifically, technical advantages generally attained, by embodiments of the present disclosure, include:

1. Using the request sent by the external brightness key to notify the brightness user interface of the operating system, thereby facilitating synchronization between the brightness control of the external brightness key system; and 2. Using the brightness user interface to notify the driver, thereby complying with the certification requirement of the software company providing the operating system.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
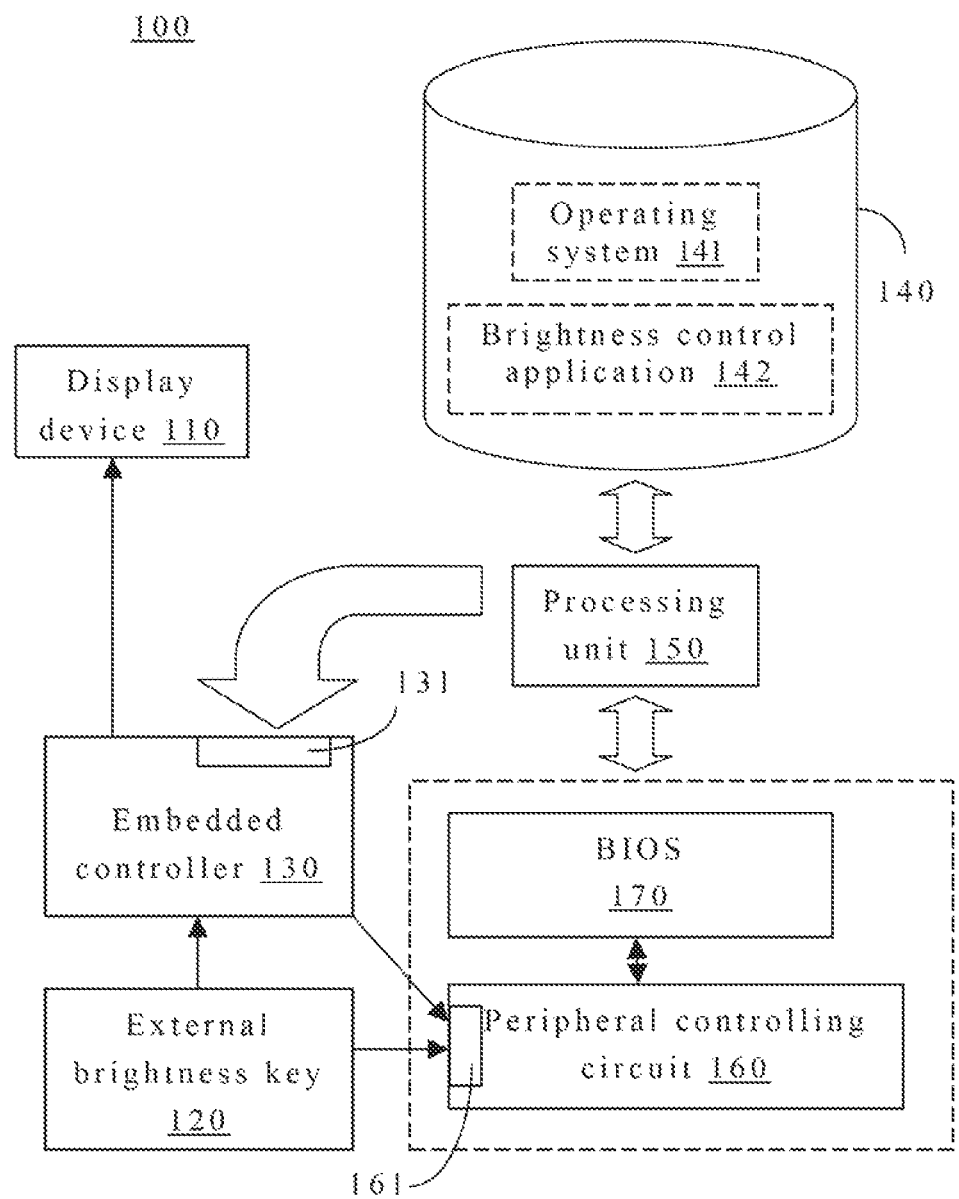
FIG. 1 is a block diagram illustrating an electronic device having a display device for synchronized brightness control according to one embodiment of the present disclosure.

In the following detailed description, for purposes of explanation, numerous specific details are set forth in order to attain a thorough understanding of the disclosed embodiments. In accordance with common practice, the various described features/elements are not drawn to scale but instead are drawn to best illustrate specific features/elements relevant to the present disclosure. Also, like reference numerals and designations in the various drawings are used to indicate like elements/parts. Moreover, well-known structures and devices are schematically shown in order to simplify the drawing and to avoid unnecessary limitation to the claimed disclosure.

FIG. 1 is a block diagram illustrating an electronic device 100 having a display device 110 for synchronized brightness control according to one embodiment of the present disclosure. As illustrated in FIG. 1, the electronic device 100 comprises an external brightness key 120, an embedded controller 130, a storage unit 140, a processing unit 150, a peripheral controlling circuit 160 and a BIOS 170. In structure, the external brightness key 120 is electrically connected to the embedded controller 130 and the peripheral controlling circuit 160; the display device 110 is electrically connected to the embedded controller 130; the embedded controller 130 is electrically connected to the peripheral controlling circuit 160; the peripheral controlling circuit 160 is electrically connected to the BIOS 170; and the processing unit 150 is electrically connected to the storage unit 140.

In implementation, the electronic device 100 can be any electronic product such as notebooks, desktops, smart phones, tablet PCs, etc. the display device 110 can be a flat display panel, such as liquid crystal display, electronic paper or other flat display devices. The external brightness key 120 may be a set of physical buttons (such as, the brightness-up button and the brightness-down button) for adjusting the brightness of the display device 110. The processing unit 150 may be a processing unit, microprocessor, or similar component architecture; and the may be a hard drive, flash memory or other computer-readable recording media. The peripheral controlling circuit 160 may be a south bridge circuit.

The storage unit 140 is configured to store the operating system 141 and the brightness control application 142; the processing unit is configured to execute the brightness control application 142 in the operating system 141, in which the brightness control application 142 may be a resident program. In this way, when the operating system 141 receives an event triggered by the external brightness key 120, it may notify the driver and the brightness control application 142 in the operating system 141 simultaneously, in which the purpose for notifying the driver is to comply with the certification requirement of the software company providing the operating system 141; however, in the present disclosure, the brightness is not adjusted by using the driver to notify the south bridge circuit; rather, the brightness control is accomplished by using the brightness control application 142 to notify the embedded controller 130.

Specifically, In one embodiment, the external brightness key 120 is directly connected to the peripheral controlling circuit 160. When the user triggers the external brightness key 120, the peripheral controlling circuit 160 is configured to receive a request from the external brightness key 120; the BIOS 170 is configured to acquire the request from the peripheral controlling circuit 160, and send an event to notify the brightness user interface of the operating system 141, so that the brightness user interface notifies a driver in the operating system and sends a brightness adjusting command to the brightness control application 142 according to the event; and the brightness control application 142 notifies the embedded controller 130 to adjust the brightness of the display device 110 according to brightness adjusting command. In this way, no matter the version of the operating system 141, it is possible to notify the brightness user interface of the operating system 141 of the request sent from the external brightness key 120, so that the brightness control of the external brightness key 120 and the bright control of the brightness user interface of the operating system 141 are synchronized.

Additionally or alternatively, in another embodiment, the external brightness key 120 connected to the peripheral controlling circuit 160 via embedded controller 130 is. After the external brightness key 120 is triggered, the external brightness key 120 is used to send a request for brightness control to the embedded controller 130; and the embedded controller 130 notifies the BIOS of the request 170 via the peripheral controlling circuit 160. The BIOS 170 is configured to acquire the request from the peripheral controlling circuit 160, and send an event to notify the brightness user interface of the operating system 141, so that the brightness user interface notifies a driver in the operating system and sends a brightness adjusting command to the brightness control application 142 according to the event, and the brightness control application 142 notifies the embedded controller 130 to adjust the brightness of the display device 110 according to brightness adjusting command. In this way, no matter the version of the operating system 141, it is possible to notify the brightness user interface of the operating system 141 of the request sent from the external brightness key 120, so that the brightness control of the external brightness key 120 and the bright control of the brightness user interface of the operating system 141 are synchronized.

On the other hand, using the brightness user interface to notify the driver is in compliance with the certification requirement of the software company distributing the operating system 141. For example, the operating system is a Microsoft operating system, such as Windows 8, and when the brightness user interface of Windows 8 notifies a driver in the operating system, the processing unit 150 may record the same in the log file stored in the storage unit 140; then Microsoft will verify the log file, and when the log file passes the authentication, Microsoft will endorse the electronic device 100 a sticker having the logo of WIN 8.

In one embodiment, the peripheral controlling circuit 160 is a south bridge circuit; the south bridge circuit is designed to process low-speed signals, and it can communicate with the processing unit 150 via the BIOS 170. The peripheral controlling circuit 160 has a serial communication interface (SCI) 161; the serial communication interface 161 is configured to directly receive a request for brightness control sent from the external brightness key 120 or indirectly receive the request via the embedded controller 130; persons having ordinary skill in the art may flexibly design the arrangement depending on the actual needs.

In one embodiment, the embedded controller 130 has a low pin count Bus 131; the low pin count bus 131 is configured to receive the notification from the brightness control application 142. On the other hand, the embedded controller 131 may send a pulse width modulated signal (PWM signal) to the display device 110, thereby adjusting the brightness of the display device 110.

Figure 2:
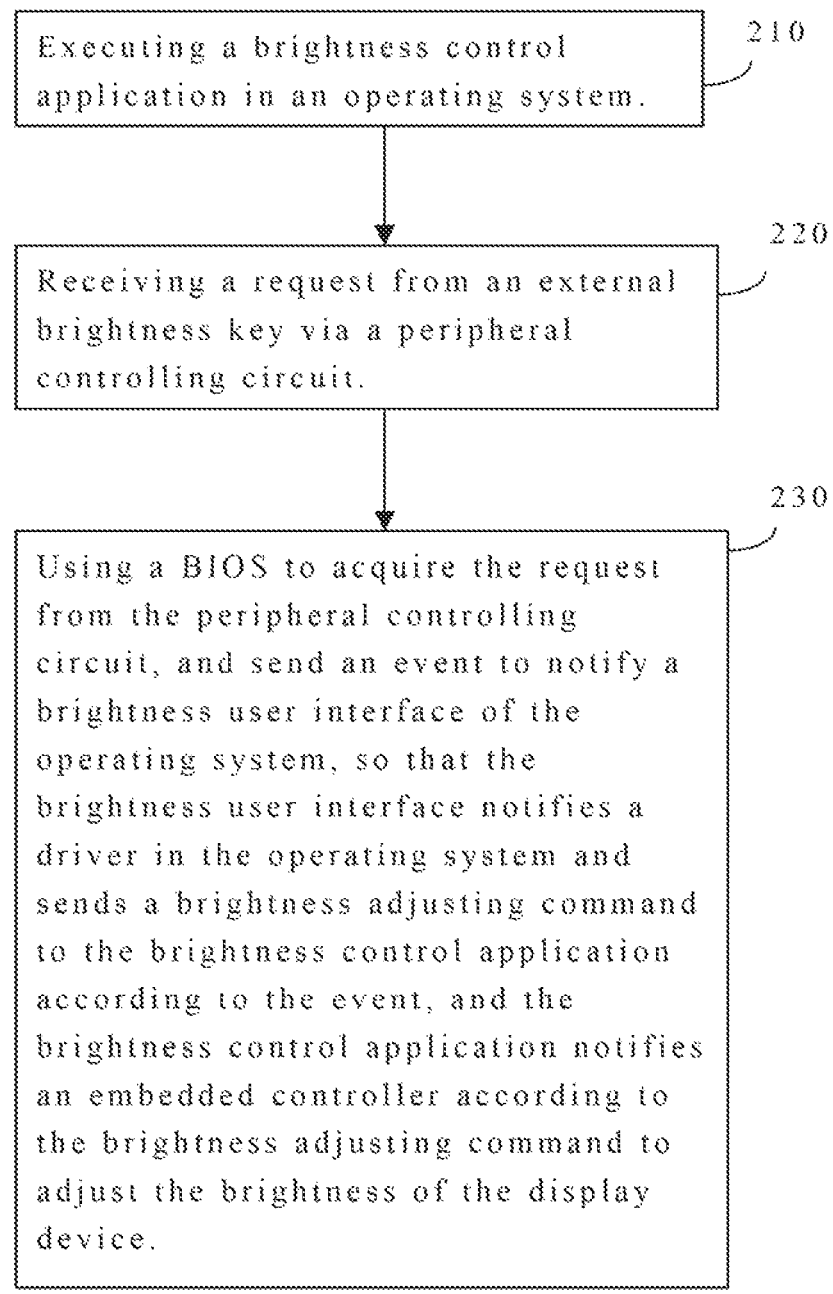
FIG. 2 is a flow diagram illustrating an operating method of an electronic device having a display device for synchronized brightness control according to one embodiment of the present disclosure.

FIG. 2 is a flow diagram illustrating an operating method 200 of an electronic device having a display device for synchronized brightness control according to one embodiment of the present disclosure. As illustrated in FIG. 2, the operating method 200 comprises steps 210 to 230. It should be appreciated that the steps are not recited in the sequence in which the steps are performed. That is, unless the sequence of the steps is expressly indicated, the sequence of the steps is interchangeable, and all or part of the steps may be simultaneously, partially simultaneously, or sequentially performed. Also, the hardware devices for implementing these steps have been specifically disclosed in the above embodiments, and hence, detailed description thereof is omitted herein for the sake of brevity.

In step 210, executing a brightness control application in an operating system; in step 220, receiving a request from an external brightness key via a peripheral controlling circuit; and in step 230, using a BIOS to acquire the request from the peripheral controlling circuit, and send an event to notify a brightness user interface of the operating system, so that the brightness user interface notifies a driver in the operating system and sends a brightness adjusting command to the brightness control application according to the event, and the brightness control application notifies an embedded controller according to the brightness adjusting command to adjust the brightness of the display device.

In one embodiment, the external brightness key is connected to the peripheral controlling circuit via the embedded controller, and the step 220 comprises: sending the request to the embedded controller after the external brightness key is triggered; and notifying the BIOS of the request via the peripheral controlling circuit, when the embedded controller.

In one embodiment, the peripheral controlling circuit is a south bridge circuit, and the step 220 comprises: directly receiving the request for brightness control sent from the external brightness key 120 via a serial communication interface of the south bridge circuit, or indirectly receiving the request via the embedded controller 130, persons having ordinary skill in the art may flexibly design the arrangement depending on the actual needs.

In one embodiment, the embedded controller has a low pin count bus, and the step 230 comprises: receiving the notification of the brightness control application via low pin count bus.

On the other hand, the step 230 comprises: sending a pulse width modulated signal to the display device via the embedded controller, so as to adjust the brightness of the display device.

In one embodiment, the operating system is a Microsoft operating system, such as Windows 8. When the brightness user interface of Windows 8 notifies a driver in the operating system, the processing unit 150 may record the same in the log file stored in the storage unit 140; then Microsoft will verify the log file, and when the log file passes the authentication, Microsoft will endorse the electronic device 100 a sticker having the logo of WIN 8.

In view of the foregoing, the request sent from the external brightness key is notified to the brightness user interface of operating system, according to the present disclosure, such that the brightness control of the external brightness key and the brightness control of the operating system are synchronized; also, using the brightness user interface to notify the driver is in compliance with the certification requirement of the software company distributing the operating system.

Although various embodiments of the disclosure have been described above with a certain degree of particularity, or with reference to one or more individual embodiments, they are not limiting to the scope of the present disclosure. Those with ordinary skill in the art could make numerous alterations to the disclosed embodiments without departing from the spirit or scope of this disclosure. Accordingly, the protection scope of the present disclosure shall be defined by the accompany claims.

What is claimed is:

1. An electronic device having a display device for synchronized brightness control, the electronic device comprising:
   an embedded controller, electrically connected to the display device, and having a low pin count bus;
   a storage unit, configured to store an operating system and a brightness control application;
   a processing unit, electrically connected to the storage unit and configured to execute the brightness control application in the operating system;
   a south bridge circuit, electrically connected to the embedded controller;
   an external brightness key, electrically connected to the embedded controller and the south bridge circuit, wherein after the external brightness key is triggered, the external brightness key sends a request to the embedded controller, and the south bridge circuit has a serial communication interface configured to receive the request from the external brightness key;
   a basic input/output system, electrically connected to the south bridge circuit and the processing unit, wherein the embedded controller notifies the basic input/output system of the request via the south bridge circuit, and the basic input/output system sends an event to notify a brightness user interface of the operating system, so that when the operating system receives the event triggered through the external brightness key, the brightness user interface of the operating system notifies a driver in the operating system and the brightness control application simultaneously, the low pin count bus of the embedded controller receives notification from the brightness control application, and the embedded controller directly sends a pulse width modulated signal to the display device without going through the south bridge circuit, so as to adjust the brightness of the display device, wherein when the driver in the operating system is notified by the brightness user interface, the processing unit records a log file in the storage unit.

2. The electronic device according to the claim 1, wherein the display device is a flat display panel.

3. An operating method of an electronic device having an external brightness key, an embedded controller, a south bridge circuit, a basic input/output system, and a display device for synchronized brightness control, the operating method comprising:

(a) executing a brightness control application in an operating system;

(b) after the external brightness key is triggered, using the external brightness key to send a request to the embedded controller, wherein the south bridge circuit has a serial communication interface configured to receive the request from the external brightness key, and the embedded controller notifies the basic input/output system of the request via the south bridge circuit; and (c) using the basic input/output system to acquire the request from the south bridge circuit, and send an event to notify a brightness user interface of the operating system, so that when the operating system receives the event triggered through the external brightness key, the brightness user interface of the operating system notifies a driver in the operating system and the brightness control application simultaneously, a low pin count bus of the embedded controller receives notification from the brightness control application, and the embedded controller directly sends a pulse width modulated signal to the display device without going through the south bridge circuit, so as to adjust the brightness of the display device, wherein when the driver in the operating system is notified by the brightness user interface, a log file is recorded.

4. An electronic device, comprising:

a display device;

a storage unit configured to store an operating system and a brightness control application;

a processing unit configured to execute the brightness control application and a driver in the operating system;

an external brightness key directly connected to the south bridge circuit, and the south bridge circuit coupled to the processing unit through a basic input/output system, wherein when the operating system receives an event triggered by the external brightness key, the operating system notifies the driver and the brightness control application simultaneously, so that the driver complies with a certification requirement as to the operating system; and an embedded controller having a low pin count bus for receiving notification from the brightness control application when the operating system notifies the driver and the brightness control application simultaneously, so that the embedded controller directly sends a pulse width modulated signal to the display device without going through the south bridge circuit, so as to adjust the brightness of the display device, wherein when the driver in the operating system is notified by the brightness user interface, the processing unit records a log file in the storage unit.

* * * * *